2 Sheets—Sheet 1.

W. R. FINCH.

Breech-Loading Fire-Arm.

No. 8,601. Reissued Feb. 25, 1879.

Witnesses
Geo. H. Strong.
Frank A. Burke

Inventor
Wm. R. Finch
By Dewey & Co.
Att'ys.

N. PETERS, PHOTO-LITHOGRAPHER, WASHINGTON, D. C.

2 Sheets—Sheet 2.

W. R. FINCH.

Breech-Loading Fire-Arm.

No. 8,601. Reissued Feb. 25, 1879.

Witnesses
Geo. H. Strong.
Frank A. Brooks

Inventor
Wm. R. Finch
By Dewey & Co.
Atty's.

N. PETERS, PHOTO-LITHOGRAPHER, WASHINGTON, D. C.

UNITED STATES PATENT OFFICE.

WILLIAM R. FINCH, OF EUREKA, CALIFORNIA.

IMPROVEMENT IN BREECH-LOADING FIRE-ARMS.

Specification forming part of Letters Patent No. 200,042, dated February 5, 1878; Reissue No. 8,601, dated February 25, 1879; application filed August 19, 1878.

*To all whom it may concern:*

Be it known that I, WILLIAM R. FINCH, of Eureka, county of Humboldt, and State of California, have invented Improvements in Breech-Loading Fire-Arms; and I do hereby declare the following to be a full, clear, and exact description thereof, reference being had to the accompanying drawings.

My invention relates to that class of breech-loading fire-arms in which the breech-block is hinged to one side of the barrel, so as to open upward and laterally; and it consists in a novel method of constructing, applying, and mounting the breech-block, so that it can be easily detached from the barrel when desired, so as to disable the gun.

It also consists of a novel arrangement of the firing-pin and certain improvements in the application of the lever which releases and opens the breech-block and operates the shell-extractor, and in certain details of construction, all of which will be more fully explained by referring to the accompanying drawings, in which—

Figure 1:
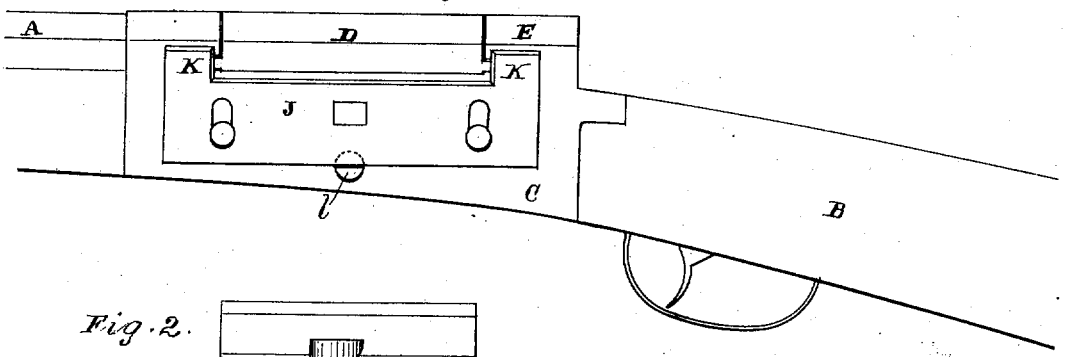
Figure 2:
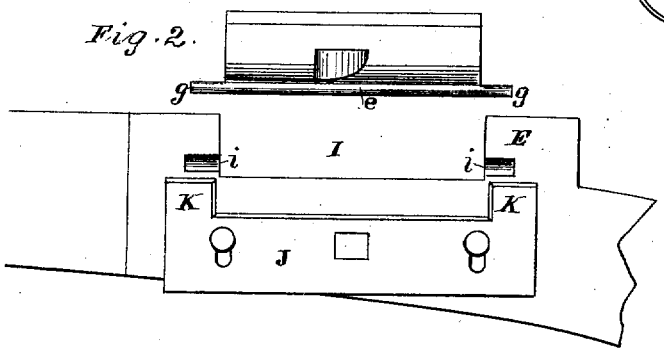
Figure 2:
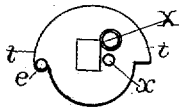
Figure 4:
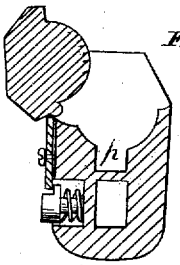
Figure 3:
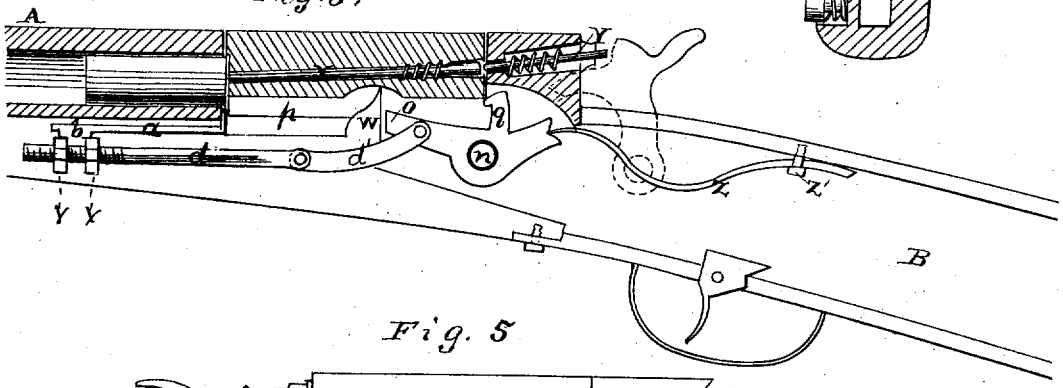
Figure 5:
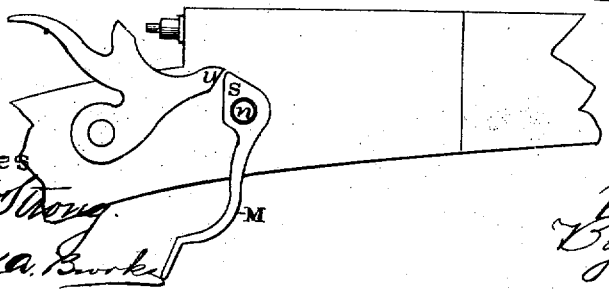
Figure 6:
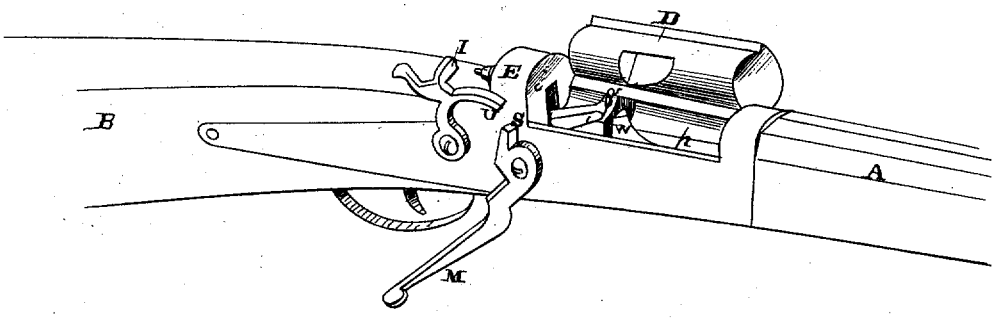

Figure 1 is a side view with the breech-block in place. Fig. 2 shows it removed. Fig. 3 is a longitudinal section. Fig. 4 is a transverse section. Fig. 5 is an elevation on the side of the gun to which is pivoted the lever. Fig. 6 is a perspective view of the gun with the breech open.

Let A represent the barrel, B the stock, and C the breech, of the gun. The recess I, in which the breech-block D fits, is made by cutting out a portion at the rear end of the barrel, so as to leave a solid block of metal, E, behind the breech-block. This recess is long enough to permit the introduction of the cartridge when the breech-block is raised.

The breech-block is a solid block of metal, its upper surface being semi-cylindrical, or otherwise suitably shaped to correspond with the top of the barrel, and with an offset, *f*, on each side, which rests upon the sides of the recess or concavity in which the block fits. Its under half is semi-cylindrical, but on a smaller radius, so as to fit in the recess. This block I hinge to one side, usually the left side, of the barrel or recess, as follows: Along the left-hand offsets or shoulder of the block I make a circular bead or rib, *e*, and extend it beyond the breech-block at each end, so as to form journals *g g*. The upward-projecting edge on the left-hand side of the recess, against which this bead fits, is made concave or hollow to fit the bead *e*, and at each end of this upward-projecting side I make an open seat or bearing, *i*, for the journals *g* to fit in. To prevent these journals from coming out of the open seats, I arrange a sliding plate, J, on that side of the barrel, which has an upward-projecting arm, K, at each end, and these will cover the seats when the plate is pushed up and fastened, thus retaining the journals of the breech-block in place.

The plate is slotted near each end, and a screw passes through each slot, so that the plate can be moved up or down the length of the slots. When up, the arms K cover the open seats and confine the journals of the breech-block; but when down, the seats are uncovered and the journals will drop out, thus detaching the breech-block. A spring push-pin, *l*, serves to latch the plate J in place when it is raised.

The breech-block opens and closes on the journals *g g*, so that it opens upward and laterally, as shown. The lever M, by means of which the breech-block is thrown open, is attached to a short shaft, *n*, which passes into the side of the gun below the rear end of the breech-block, and the lever extends along under the hammer and to a distance in rear of it, where it will be most convenient to the thumb of the person who holds the gun.

A longitudinal channel, *p*, is made in the bottom of the chamber or recess in which the breech-block fits, and in this channel the devices which operate the breech-block and shell-extractor are placed. The inner end of the shaft *n* is firmly attached to a two-armed lever, one arm of which (marked *o*, and provided with a rectangular lug, *o'*, for steadying the breech-block) lies in the channel *p*, below the breech-block, while the other, *q*, stands upright and fits in a recess in the standing breech in rear of the breech-block. This upright arm *q* has a latch-head on its upper end, and a flat spring, Z, is arranged to press it forward, as shown. The breech-block has a recess in its rear end, into which the latch-head of the arm *q* is forced by the spring when the block is closed down, and the breech-block is thus firmly locked. The arm *o* of the lever passes forward a short distance under the breech-block in the channel *p*, so that when the lever M is thrown down the latch *q* is thrown backward out of the recess in the breech-block, so as to free the block just as the lever O moves upward against it to throw it open.

The lever M has a projection or arm, S, extending upward from near its pivoted end, and the hammer T has a nose or projection, *u*, extending forward from it alongside the barrel, so that as the lever is thrown down the arm S will push backward upon the nose of the hammer and set it at a half-cock, thus relieving the pressure of the hammer on the firing-pin, so that it can clear itself from the breech-block.

The shell-extractor consists of the bar *a*, which moves in an extension of the channel *p* under the barrel, as shown at Fig. 3. This bar has a lug, *b*, on its under side, and the lug is connected with the arm *o* by a hinged rod, *d d'*, so that the same movement of the lever M which unlatches the breech-block and forces it open operates the retractor. The end of the rod *d* is formed into a screw, and is attached to the lug *b* of the extractor-bar by means of two set-nuts, V V, between which the lug passes. By setting these nuts toward or from the end of the rod the movement of the extractor can be adjusted to any time or distance of movement desired.

An inclined block, W, may be secured in the bottom of the cavity in which the breech-block fits to throw the ejected cartridge out of the recess. When the shell is drawn backward with a sudden movement it will strike this incline W and be forcibly thrown upward and backward entirely out of the chamber. This sudden or forcible action is effected in depressing the lever M by the action of the spring Z, which is connected with the rear end of the arm *q* of the double lever, and extends backward to a post, Z', where it rests or is secured, so as to have a considerable tension.

Now, when the lever M is pressed down and the shaft N rotates until the arm *q* passes a certain point, the tension of this spring finishes the motion with a sharp snap, which throws the lever O up, opens the breech-block, and forcibly ejects the shell. When the lever M is raised to return the parts to their position the spring Z again acts to forcibly return them after the arm *q* has passed this central point in its movements, and thus this single spring serves to forcibly eject the shell, and also to force the arm *q* forward and lock the breech-block in place when closed, as previously described.

To fire the cartridge, I use a firing-pin which is made in two separate pins or sections. One of these pins, X, extends longitudinally through the breech-block, so as to strike the cartridge and fire it, while the other, Y, passes through the standing breech E in rear of the breech-block. These pins are so adjusted that when the breech-block is closed down they will be in line with each other, so that a percussion on the projecting end of the pin Y will force it against the end of the pin X, and thus fire the cartridge.

By making an indentation, *x*, in the rear end of the breech-block, into which the end of the firing-pin Y will enter when the breech-block is partly open, I can throw the two firing-pins out of line with each other, and thus render the gun perfectly safe when it is loaded, even if the hammer should be allowed to fall upon the pin Y.

The operation of loading is then accomplished as follows: The person who holds the gun presses the lever M downward and forward with the thumb of his right hand. This sets the hammer at half-cock, unlatches the breech-block, forces it open, and discharges the spent cartridge-shell. He then instantly draws the lever back with his hand. This restores the lifting-lever and retractor to their proper positions. He then inserts the fresh cartridge and closes the breech-block, when the gun is again ready to fire.

If he should at any time desire to disable or dismount the gun, he can do so by detaching the breech-block and placing it out of reach. This arrangement is very strong, simple, and easily operated.

The gun has no projecting or cumbrous parts, and cannot become fouled by ordinary usage.

Having thus described my invention, what I claim, and desire to secure by Letters Patent, is—

1. The breech-block D, with its axes or trunnions *g g* arranged to be journaled in the open seats or bearings *i*, in combination with the sliding plate J, with its covering-arms K, and the spring-press pin *l*, or equivalent device, substantially as and for the purpose herein described.

2. The standing breech E, having the pin Y passing through it and receiving the stroke of the hammer, in combination with the breech-block D, swinging laterally upon the longitudinal trunnions *g g*, and provided with the firing-pin X, which stands in line with the pin Y when the breech is closed, said breech-block having the safety pocket or opening *x* to receive the pin Y when the breech is partially open and prevent the gun from being fired, substantially as and for the purpose herein described.

3. The double or bell-crank lever, mounted upon the horizontal shaft *n* so as to lie below and behind the breech-block chamber, said lever having one arm, *q*, which serves to latch and lock the breech-block in place when closed, while the other arm, *o*, operates the shell-extractor *a* by means of the link or rod *d d'*, substantially as and for the purpose herein described.

4. The double or bell-crank lever O *q*, mounted upon the shaft *n*, and provided with the single spring Z, bearing against the rear of the arm *q*, so that its elasticity shall move the levers in either direction from a certain central point of their movement, in combination with the breech-block of a breech-loading gun, for operating the same, substantially as described.

5. The lever M, shaft *n*, lever O *q*, in combination with the link *d d'*, retractor *a*, and adjusting-nuts V V, substantially as set forth.

6. The breech block D, swinging laterally upon longitudinal trunnions, in combination with the lifting-lever O *q*, said lever being provided with a lug, *o'*, to steady the breech-block when opened, substantially as herein described.

In witness whereof I hereunto set my hand and seal.

WILLIAM ROSE FINCH. [L. S.]

Witnesses:

JOHN MILLER,

W. C. STEWART.